(12) United States Patent
Thomas et al.

(10) Patent No.: US 10,169,582 B2
(45) Date of Patent: *Jan. 1, 2019

(54) SYSTEM, METHOD, AND COMPUTER PROGRAM PRODUCT FOR IDENTIFYING A FILE USED TO AUTOMATICALLY LAUNCH CONTENT AS UNWANTED

(71) Applicant: McAfee, Inc., Santa Clara, CA (US)

(72) Inventors: Vinoo Thomas, Bangalore (IN); Palasamudram Ramagopal Prashanth, Pune (IN); Rahul Mohandas, Bangalore (IN)

(73) Assignee: McAfee, LLC, Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/595,917

(22) Filed: Jan. 13, 2015

(65) Prior Publication Data
US 2015/0186650 A1 Jul. 2, 2015

Related U.S. Application Data

(63) Continuation of application No. 12/436,694, filed on May 6, 2009, now Pat. No. 8,990,943.

(51) Int. Cl.
*G06F 21/56* (2013.01)

(52) U.S. Cl.
CPC ............ *G06F 21/562* (2013.01); *G06F 21/56* (2013.01); *G06F 2221/034* (2013.01)

(58) Field of Classification Search
CPC ......... G06F 21/56; G06F 21/562; G06F 21/00
See application file for complete search history.

(56) References Cited

U.S. PATENT DOCUMENTS

| | | | |
|---|---|---|---|
| 8,990,943 B2 | 3/2015 | Thomas et al. | |
| 2008/0010538 A1 | 1/2008 | Satish et al. | |
| 2008/0115219 A1* | 5/2008 | Kim ................... | G06F 21/563 726/25 |
| 2009/0077664 A1* | 3/2009 | Hsu .................... | G06F 21/566 726/24 |
| 2009/0138969 A1* | 5/2009 | Kim ................... | G06F 21/51 726/22 |
| 2009/0320134 A1* | 12/2009 | Corcoran ............ | G06F 21/562 726/24 |

OTHER PUBLICATIONS

Buyya et al., "Market-Oriented Cloud Computing: Vision, Hype, and Reality for Delivering IT Services as Computing Utilities," Proceedings of the 10th IEEE International Conference, Dalian, China, Sep. 2008, 9 pages.

(Continued)

*Primary Examiner* — Brandon S Hoffman
*Assistant Examiner* — Nega Woldemariam
(74) *Attorney, Agent, or Firm* — Hanley, Flight & Zimmerman, LLC

(57) ABSTRACT

A system, method, and computer program product are provided for identifying a file utilized to automatically launch content as unwanted. In one embodiment, a file is identified in response to a detection of unwanted code, the file utilized to automatically launch content. Additionally, it is determined whether an identifier associated with the unwanted code is included in the file. Further, the file is identified as unwanted based on the determination.

31 Claims, 6 Drawing Sheets

(56) References Cited

OTHER PUBLICATIONS

David Chappell, "A Short Introduction to Cloud Platforms: An Enterprise-Oriented View," Chappell & Associates, Aug. 2008, 13 pages.
"Welcome to Software Central," U3 LLC, 2005-2008, 1 page, retrieved from http://www.u3.com.
"BackTrack Downloads," 2007, 3 pages, retrieved from http://www.remote-exploit.org/backtrack_download.html.
Posey, "Boot Windows XP from a USB Flash Drive," CNET Australia, Oct. 19, 2006, 5 pages.
"Virus Alerts," CERT-In: Indian Computer Emergency Response Team, Oct. 21, 2008, 3 pages, retrieved from http://www.cert-in.org.in/virus/worm_hamweq_htm.
McAfee, Inc., "PWS-Gamania.gen.a," Aug. 28, 2008, 8 pages, retrieved from http://vil.nai.com/vil/content/v_147533.htm.
McAfee, Inc., "W32/Sality.ah," Jul. 21, 2008, 8 pages, retrieved from http://vil.nai.com/vil/content/v_147094.htm.
http://www.yesblog.cn/attachment/200803/1205203057_5887c281.txt, last accessed May 4, 2009, 4 pages.
http://www.diybl.com/course/4_webprogram/asp.net/netjs/2008410/109018.html, last accessed May 4, 2009, 5 pages.
Leyden, "HP Proliant USB Key Riddled with Worms," Enterprise Security, Apr. 7, 2008, 2 pages, retrieved from http://www.theregister.co.uk/2008/04/07/hp_proliant_usb_key_infection/.
Naraine et al., "Asus Ships Eee Box PCs with Malware," Zero Day, Oct. 9, 2008, 2 pages, retrieved from http://blogs.zdnet.com/security/?p=2016.
Virus Bulletin Ltd., "Batch of Dutch MP3 Players Ships with Malware," Jan. 8, 2008, 1 page, retrieved from http://www.virusbtn.com/news/2008/01_08a.xml.
Lemos, "Best Buy Recalls Infected Picture Frames," Security Focus, Jan. 28, 2008, 1 page, retrieved from http://www.securityfocus.com/brief/670.
Shachtman, "Under Worm Assault, Military Bans Disks, USB Drives," Nov. 19, 2008, 10 pages, retrieved from http://blog.wired.com/defense/2008/11/army-bans-usb-d.html.
Naraine et al., "Malware-infected USB Drives Distributed at a Security Conference," Zero Day, May 23, 2008, 1 page, retrieved from http://blogs.zdnet.com/security/?p=1173.
"Computer Viruses Make it to Orbit," BBC News, Aug. 27, 2008, 2 pages, retrieved from http://news.bbc.co.uk/2/hi/technology/7583805.stm.
Bennett, "News," AutoIT v3, copyright 1999-2009, 3 pages, retrieved from http://www.autoitscript.com/AutoIt/.
"UPX: the Ultimate Packer for eXecutables, Version 3.03," Apr. 27, 2008, 5 pages, retrieved from http://upx.sourceforge.net/.
"Full Version: Tubgirl Shock Worm," Apr. 6, 2008, 8 pages, retrieved from http://www.rohitab.com/discuss/lofiversion/index.php/t30128.html.
"AutoIt Decompiler Unpacker and Script Converter," Jan. 31, 2008, 4 pages, retrieved from http://leechermods.blogspot.com/2008/02/autoit-decompiler-unpacker-and-script.html.
Wikipedia, "AutoRun," last modified May 4, 2009, 21 pages, retrieved from http://en.wikipedia.org/wiki/autorun.
Microsoft Corporation, "Autorun.inf Entries," 2009, 8 pages, retrieved from http://msdn.microsoft.com/en-us/library/bb776823.aspx.
McAfee, Inc., "Genericlatr," Jun. 27, 2007, 3 pages, retrieved from http://vil.nai.com/vil/content/v_141387.htm.
McAfee, Inc., "Regional Virus Information," retrieved May 4, 2009, 1 page, retrieved from http://us.mcafee.com/virusInfo/default.asp?id=regional.
McCormack, "Taterf—all your drives are belong to me!!!1!one!," Microsoft Malware Protection Center, Threat Research & Response Blog, Microsoft Corporation, Jun. 20, 2008, 4 pages, retrieved from http://blogs.technet.com/mmpc/archive/2008/06/20/taterf-all-your-drives-are-belong-to-me-1-one.aspx.
NOD 32 Antivirus System, "Global Threat Trends—Nov. 2008," ESET, Nov. 2008, 9 pages, retrieved from http://www.eset.com/threat-center/case_study/global_threat_trends_november_2008.pdf.
McAfee, Inc., "The Hidden Gap of Unknown Threats," 1 page, retrieved from http://www.mcafee.com/us/enterprise/products/artemis_technology/index.html.
McAfee, Inc., "From Zero-day to Real-time," 2008, 9 pages, retrieved from http://www.mcafee.com/us/local_content/technical_briefs/wp_zero_day_to_real_time.zip.
McAfee, Inc., "W32/Hupigon.worm," Apr. 18, 2007, 14 pages, retrieved from http://vil.nai.com/vil/content/v_142042.
United States Patent and Trademark Office, "Notice of Allowance," issued in connection with U.S. Appl. No. 12/436,694, dated Oct. 24, 2014, 11 pages.
United States Patent and Trademark Office, "Non-final Office Action," issued in connection with U.S. Appl. No. 12/436,694, dated Jul. 14, 2014, 13 pages.
United States Patent and Trademark Office, "Final Office Action," issued in connection with U.S. Appl. No. 12/436,694, dated Mar. 1, 2012, 18 pages.
United States Patent and Trademark Office, "Non-final Office Action," issued in connection with U.S. Appl. No. 12/436,694, dated Sep. 15, 2011, 13 pages.

* cited by examiner

SYSTEM, METHOD, AND COMPUTER PROGRAM PRODUCT FOR IDENTIFYING A FILE USED TO AUTOMATICALLY LAUNCH CONTENT AS UNWANTED

RELATED APPLICATION

This patent arises from a continuation of U.S. patent application Ser. No. 12/436,694 (now U.S. Pat. No. 8,990,943) which was filed on May 6, 2009. Priority to U.S. patent application Ser. No. 12/436,694 is hereby claimed.

TECHNICAL FIELD

The present invention relates to unwanted code, and more particularly to unwanted code associated with autorun files.

BACKGROUND ART

Traditionally, security systems have been employed for detecting and optionally removing unwanted code (e.g. malware, etc.). Unfortunately, traditional security systems have exhibited various limitations in determining whether files used to automatically launch content (hereinafter autorun files) are unwanted (e.g. malicious, etc.). Just by way of example, traditional security system have customarily only removed unwanted content capable of being automatically launched by an autorun file, without also removing the autorun file. Thus, the remaining autorun file, when loaded, is typically is a source of unwanted errors since the content attempted to be launched by such autorun file is nonexistent.

However, even when some traditional security systems have attempted to remove unwanted autorun files, the techniques employed to do so have been problematic. For example, contents of the autorun file may be obfuscated by a malware author, malware launched by, and thus referenced by, the autorun file may have a random file name, etc. such that traditional string or hash based signature detection techniques for identifying the autorun file as unwanted may be prevented. As another example, if the malware launched by the autorun file has a common file name (e.g. a file named for non-malicious purposes as well), simply identifying the autorun file as unwanted based on a detection of the common file name therein may result in a false detection of the autorun file as unwanted. There is thus a need for addressing these and/or other issues associated with the prior art.

SUMMARY

A system, method, and computer program product are provided for identifying a file utilized to automatically launch content as unwanted. In one embodiment, a file is identified in response to a detection of unwanted code, the file utilized to automatically launch content. Additionally, it is determined whether an identifier associated with the unwanted code is included in the file. Further, the file is identified as unwanted based on the determination.

In another embodiment, in response to detection of a coupling of a removable storage device to a computer system, a file utilized to automatically launch content is identified. In addition, it is locally determined whether the content matches one of a plurality of local predetermined unwanted codes. Furthermore, if it is locally determined that the content does not match the one of the plurality of local predetermined unwanted codes, information identifying the content is transmitted to a remote device for remotely determining whether the content matches one of a plurality of remote predetermined unwanted codes. Still yet, the content and the file is identified as unwanted in response to a determination that the content matches the one of the plurality of local predetermined unwanted codes or the one of the plurality of remote predetermined unwanted codes.

DESCRIPTION OF EMBODIMENTS

Figure 1:
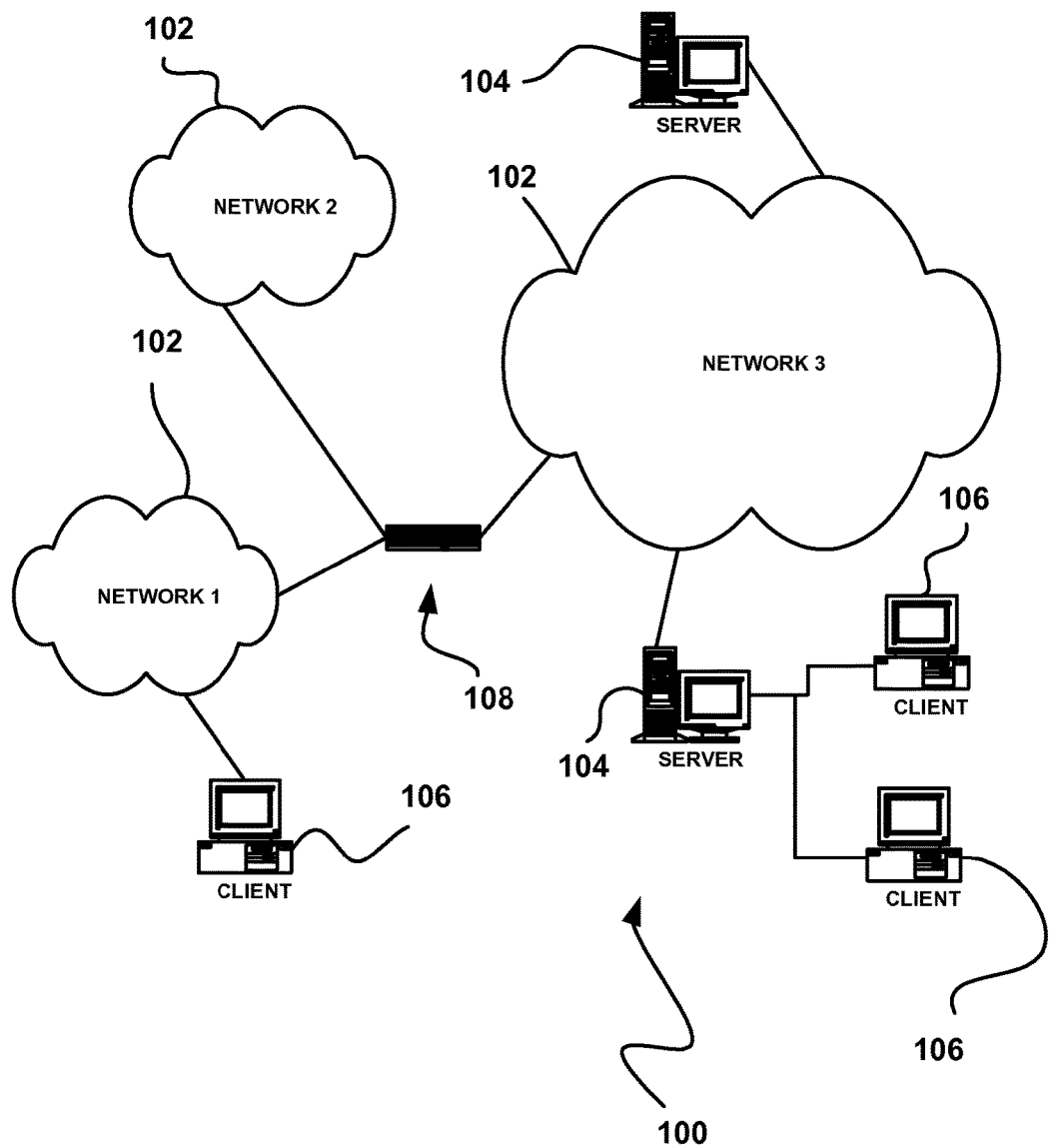
FIG. 1 illustrates a network architecture, in accordance with one embodiment.

FIG. 1 illustrates a network architecture 100, in accordance with one embodiment. As shown, a plurality of networks 102 is provided. In the context of the present network architecture 100, the networks 102 may each take any form including, but not limited to a local area network (LAN), a wireless network, a wide area network (WAN) such as the Internet, peer-to-peer network, etc.

Coupled to the networks 102 are servers 104 which are capable of communicating over the networks 102. Also coupled to the networks 102 and the servers 104 is a plurality of clients 106. Such servers 104 and/or clients 106 may each include a desktop computer, lap-top computer, hand-held computer, mobile phone, personal digital assistant (PDA), peripheral (e.g. printer, etc.), any component of a computer, and/or any other type of logic. In order to facilitate communication among the networks 102, at least one gateway 108 is optionally coupled therebetween.

Figure 2:
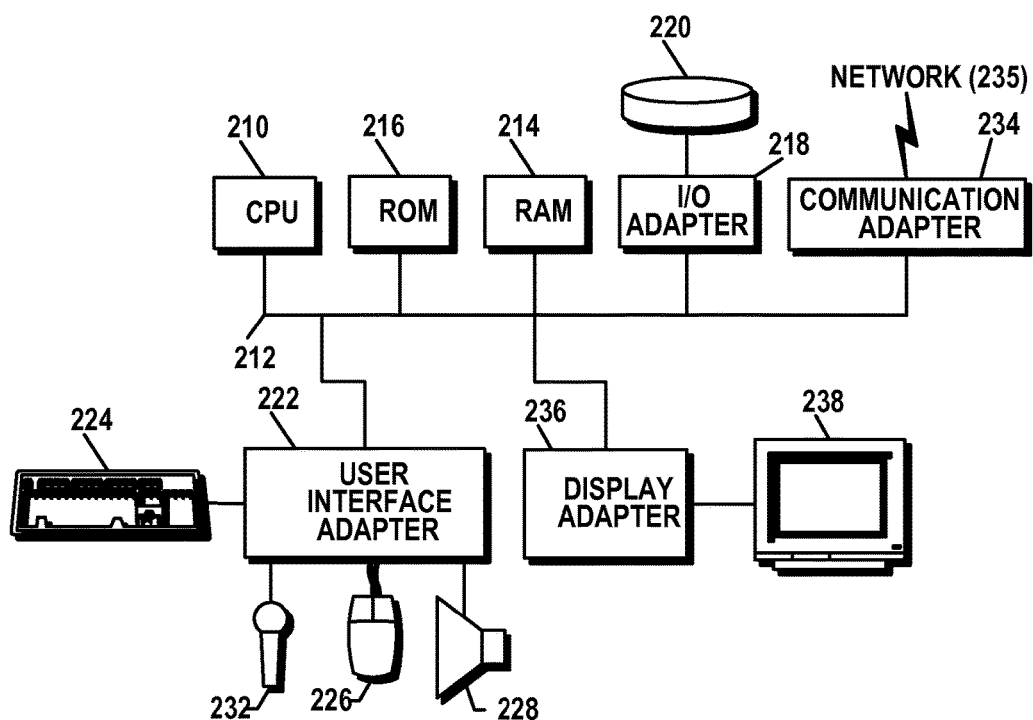
FIG. 2 shows a representative hardware environment that may be associated with the servers and/or clients of FIG. 1, in accordance with one embodiment.

FIG. 2 shows a representative hardware environment that may be associated with the servers 104 and/or clients 106 of FIG. 1, in accordance with one embodiment. Such figure illustrates a typical hardware configuration of a workstation in accordance with one embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon any desired operating system. It will be appreciated that an embodiment may also be implemented on platforms and operating systems other than those mentioned. One embodiment may be written using JAVA, C, and/or C++ language, or other programming languages, along with an object oriented programming methodology. Object oriented programming (OOP) has become increasingly used to develop complex applications.

Of course, the various embodiments set forth herein may be implemented utilizing hardware, software, or any desired combination thereof. For that matter, any type of logic may be utilized which is capable of implementing the various functionality set forth herein.

Figure 3:
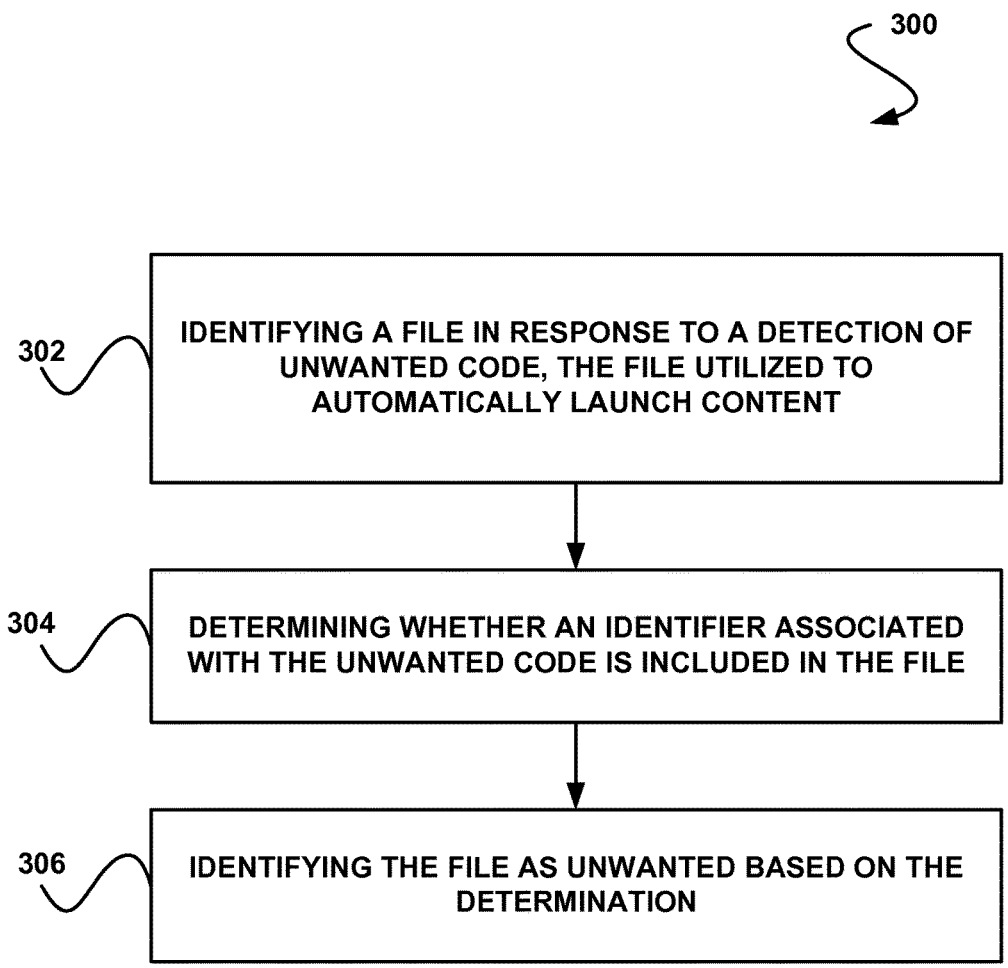
FIG. 3 shows a method for identifying a file utilized to automatically launch content as unwanted, in accordance with one embodiment.

FIG. 3 shows a method 300 for identifying a file utilized to automatically launch content as unwanted, in accordance with one embodiment. As an option, the method 300 may be carried out in the context of the architecture and environment of FIGS. 1 and/or 2. Of course, however, the method 300 may be carried out in any desired environment.

As shown in operation 302, a file utilized to automatically launch content is identified in response to a detection of unwanted code. With respect to the present description, the file may include any type of file that is capable of being utilized for automatically launching content. Just by way of example, the file may include an autorun.inf file.

In one embodiment, launching the content may include executing the content and/or otherwise initiating execution of the content. To this end, the content may include an executable (e.g. executable code) and/or any other type of code capable of being launched. Just by way of example, the content may include a script, etc. In another embodiment, the file may include a path to the content, a file name of the content, or any other type of pointer to the content for use in locating the content and executing the same.

In another embodiment, the file may be used to automatically launch the content such that user interaction is not necessarily required to launch the content. In yet another embodiment, the file may automatically launch the content in response to a removable storage device [e.g. memory stick, universal serial bus (USB) drive, portable hard drive, flash media card, etc.) being inserted into a computer system. For example, the removable storage device may store the content and/or the file, such that upon a coupling of the removable storage device to the computer system, an application of the computer system may detect the file and enable the file to automatically launch the content. Of course, however, the content may optionally be stored remotely with respect to the removable storage device (e.g. may be stored on the computer system, etc.).

Further, the unwanted code may include any code (e.g. application, etc.) that is determined to be unwanted. For example, the code may be unwanted if the code is malware, spyware, etc. As an option, the unwanted code may be detected based on a scan (e.g. utilizing an anti-malware scanner, etc.). Accordingly, in response to detection of the unwanted code, the file utilized for launching content is identified.

It should be noted that the file may be identified in any desired manner. Optionally, the file may be identified prior to being used to automatically launch the content. In one embodiment, the file may be identified by scanning a root of every storage device, or optionally every removable storage device, for the file.

Just by way of example, the file may include a predetermined file extension (e.g. ".inf"), such that the file may be identified by identifying a file with the predetermined file extension. As another example, the file may be located in a predetermined storage location (e.g. a removable storage device, a shared network resource, etc.), such that the file may be identified by identifying a file at the predetermined storage location. As yet another example, the file may be associated with a particular format, such that the file may be identified by identifying a file with the particular format.

Additionally, as shown in operation 304, it is determined whether an identifier associated with the unwanted code is included in the file. In one embodiment, the identifier associated with the unwanted code may include a file name of the unwanted code. In another embodiment, the identifier associated with the unwanted code may include a path name (e.g. including a driver letter, etc.) to the unwanted code. Of course, however, the identifier associated with the unwanted code may include any desired information capable of being utilized to identify the unwanted code.

Moreover, the determination of whether the identifier associated with the unwanted code is included in the file may be made in any desired manner. For example, determining whether the identifier associated with the unwanted code is included in the file may include determining (e.g. identifying, etc.) the identifier associated with the unwanted code, in one embodiment. The identifier associated with the unwanted code may optionally be determined by identifying a file name of the unwanted code, identifying a path name indicating a location of the unwanted code, etc.

As another example, determining whether the identifier associated with the unwanted code is included in the file may include scanning the file for the identifier. Thus, upon determining the identifier associated with the unwanted code, the file may be scanned for the identifier in order to determine whether the identifier associated with the unwanted code is included in the file. As another example, determining whether the identifier associated with the unwanted code is included in the file may include parsing the file to identify the contents of the file and comparing the identifier associated with the unwanted code to the contents of the file.

Further, the file is identified as unwanted based on the determination, as shown in operation 306. In one embodiment, the file may be identified as unwanted in response to a determination that the identifier associated with the unwanted code is included in the file. In another embodiment, the file may not necessarily be identified as unwanted in response to a determination that the identifier associated with the unwanted code is not included in the file.

As an option, if it is determined that the file includes the identifier associated with the unwanted code, the file may be identified as unwanted since it is capable of being utilized to launch the unwanted code. Thus, for example, the file may be unwanted since may be utilized for the malicious purpose of launching the unwanted code. In one optional embodiment, identifying the file as unwanted may include flagging the file as being unwanted.

In one exemplary embodiment, the content capable of being launched via the file may include the unwanted code. Thus, the content may be scanned (e.g. via an anti-malware scanner, etc.) for determining whether the content includes unwanted code. In various embodiments, the content may be scanned on-demand, on-access, etc. In this way, the unwanted code included in the content may be detected based on the scanning of the content.

Still yet, in response to the detection of the unwanted code, the file utilized for automatically launching the content may be identified. Once the file is identified, it may be determined whether an identifier associated with the unwanted code is included in the file, such that the file may optionally be identified as unwanted only if the file is determined to include the identifier associated with the unwanted code.

By identifying the file as unwanted based on a determination of whether an identifier associated with unwanted data is included in the file, the unwanted code and the file utilized for launching such unwanted code may both be identified in association with one another. In addition, detection of the file utilized for launching the unwanted code may be identified regardless of any obfuscation techniques (e.g. incorporating polymorphic contents in the file, junk characters in the file, etc.) employed by authors of the unwanted code for attempting to avoid detection. Moreover, since unwanted code and the file utilized for launching such unwanted code may both be identified in association with one another, false positive identifications of the file as unwanted (e.g. resulting from scanning the file for a common file name which may potentially not be associated with unwanted code) may be prevented.

As an option, the unwanted code may be deleted. For example, the unwanted code may be deleted after the identification of the file as unwanted. Of course, however, the unwanted code may be deleted at any desired time. As another option, the file may be deleted in response to an identification of the file as unwanted. Thus, the file may be deleted if the identifier associated with the unwanted code is included in the file indicating that the file is utilized for launching the unwanted code. In other embodiments, the unwanted code and/or file may be quarantined, and/or any other desired action may be performed in response to the identification of the file as unwanted.

More illustrative information will now be set forth regarding various optional architectures and features with which the foregoing technique may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
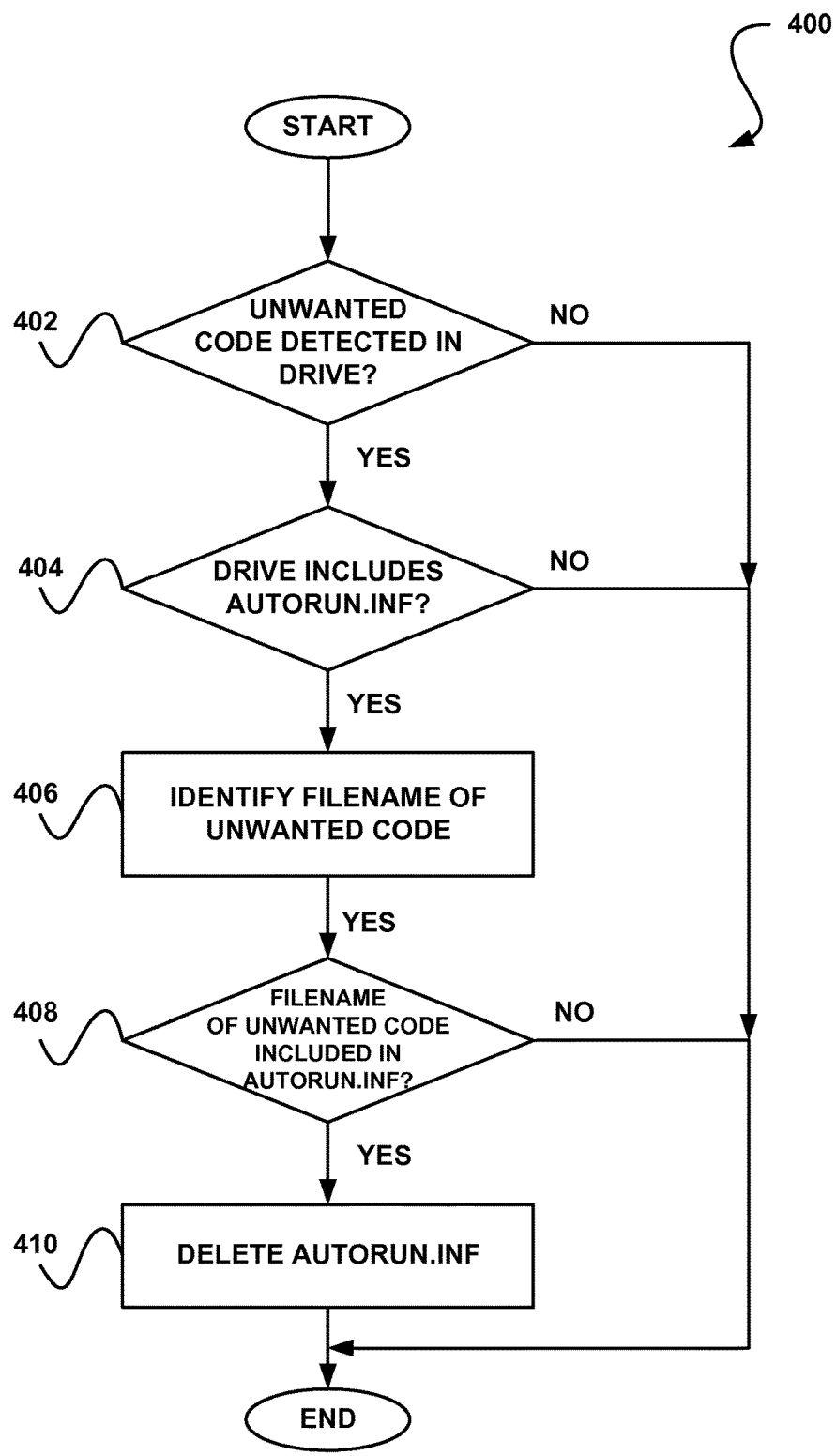
FIG. 4 shows a method for deleting a file utilized to automatically launch content in response to a determination that the file is unwanted, in accordance with another embodiment.

FIG. 4 shows a method 400 for deleting a file utilized to automatically launch content in response to a determination that the file is unwanted, in accordance with another embodiment. As an option, the method 400 may be carried out in the context of the architecture and environment of FIGS. 1-3. Of course, however, the method 400 may be carried out in any desired environment. It should also be noted that the aforementioned definitions may apply during the present description.

As shown in decision 402, it is determined whether unwanted code is detected on a drive. The drive may include a hard drive. Of course, it should be noted that in other embodiments it may be determined whether unwanted code is detected on any desired storage device (e.g. removable storage device, a fixed storage device, etc.).

In one embodiment, the unwanted code may be detected as a result of scanning the drive for the unwanted code. As an option, the scanning may be performed by an anti-virus scanner. As another option, the scanning may be performed in response to a coupling of the drive to a computer system capable of determining whether the unwanted code is detected on the drive.

If it is determined that unwanted code is not detected, the method 400 terminates. If, however, it is determined that unwanted code is detected, it is further determined whether the drive includes an autorun.inf file. Note decision 404. Determining whether the drive includes the autorun.inf file may include determining whether the drive includes a file with a file name predetermined to be indicative of an autorun.inf file, determining whether the drive includes a file with a format predetermined to be indicative of an autorun.inf file, etc.

Optionally, the determination of whether the drive includes the autorun.inf file may be made prior to the unwanted code being cleaned (e.g. deleted, etc.). As another option, the determination of whether the drive includes the autorun.inf file may be made in response to a determination that the detected unwanted code is of a type predetermined to proliferate via an autorun.inf file. The determination of whether the detected unwanted code is of a type predetermined to proliferate via an autorun.inf file may be made by querying a database of known unwanted code that is predetermined (e.g. known based on a history of the known unwanted code) to proliferate via an autorun.inf file. Thus, if the detected unwanted code matches one of the known unwanted codes in the database, it may be determined that the detected unwanted code is of a type predetermined to proliferate via an autorun.inf file.

As another example, the determination of whether the detected unwanted code is of a type predetermined to proliferate via an autorun.inf file may be made by categorizing the detected unwanted code. Further, a database of categories of known unwanted code that is predetermined (e.g. known based on a history of the known unwanted code) to proliferate via an autorun.inf file may be queried for the category of the detected unwanted code. To this end, if the category of the detected unwanted code matches one of the categories in the database, it may be determined that the detected unwanted code is of a type predetermined to proliferate via an autorun.inf file. Thus, the method 400 may only determine whether the drive includes the autorun.inf file (e.g. by searching the drive, etc.) if it is determined that the detected unwanted code is of a type predetermined to proliferate via an autorun.inf file.

Table 1 shows one example of contents of an autorun.inf file. It should be noted that such autorun.inf file content is set forth for illustrative purposes only, and thus should not be construed as limiting in any manner.

TABLE 1

[AutoRun]
open=scvhose.exe
shellexecute=svchose.exe
shell\Auto\command=svchose.exe If it is determined that the drive does not include the autorun.inf file, the method 400 terminates. If, however, it is determined that the drive includes the autorun.inf file, a filename of the unwanted code is identified. Note operation 406. The filename may include any name of a file of the unwanted code, a path name to the unwanted code, etc.

Furthermore, it is determined whether the filename of the unwanted code is included in the autorun.inf file, as shown in decision 408. In one embodiment, the autrun.inf file may be searched for the filename of the unwanted code. If it is determined that the filename of the unwanted code is not included in the autorun.inf file, the method 400 terminates.

If, however, it is determined that the filename of the unwanted code is included in the autorun.inf file, the autorun.inf file is deleted, as shown in operation 410. In this way, the autorun.inf file may be deleted if the autorun.inf file includes a reference to the unwanted code such that the autorun.inf file is capable of being used to launch the unwanted code. Moreover, since the autorun.inf file may include only one reference to code, it may be ensured that the reference to the unwanted code in the autorun.inf file is the only reference to code by the autorun.inf file, and thus that the autorun.inf file may be deleted without losing any additional information included therein. As an option, the unwanted code may also be deleted (e.g. in response to the deletion of the autorun.inf file, etc.).

Table 2 shows one example of pseudocode which illustrates the method 400 of FIG. 4. It should be noted that such pseudocode is set forth for illustrative purposes only, and thus should not be construed as limiting in any manner.

TABLE 2

```
if (malware detected in drive) then
{
    if(drive has autorun.inf) then
    {
        if(autorun.inf has the malware entry) then
        {
            detect and delete autorun.inf
        }
    }
}
```

Figure 5:
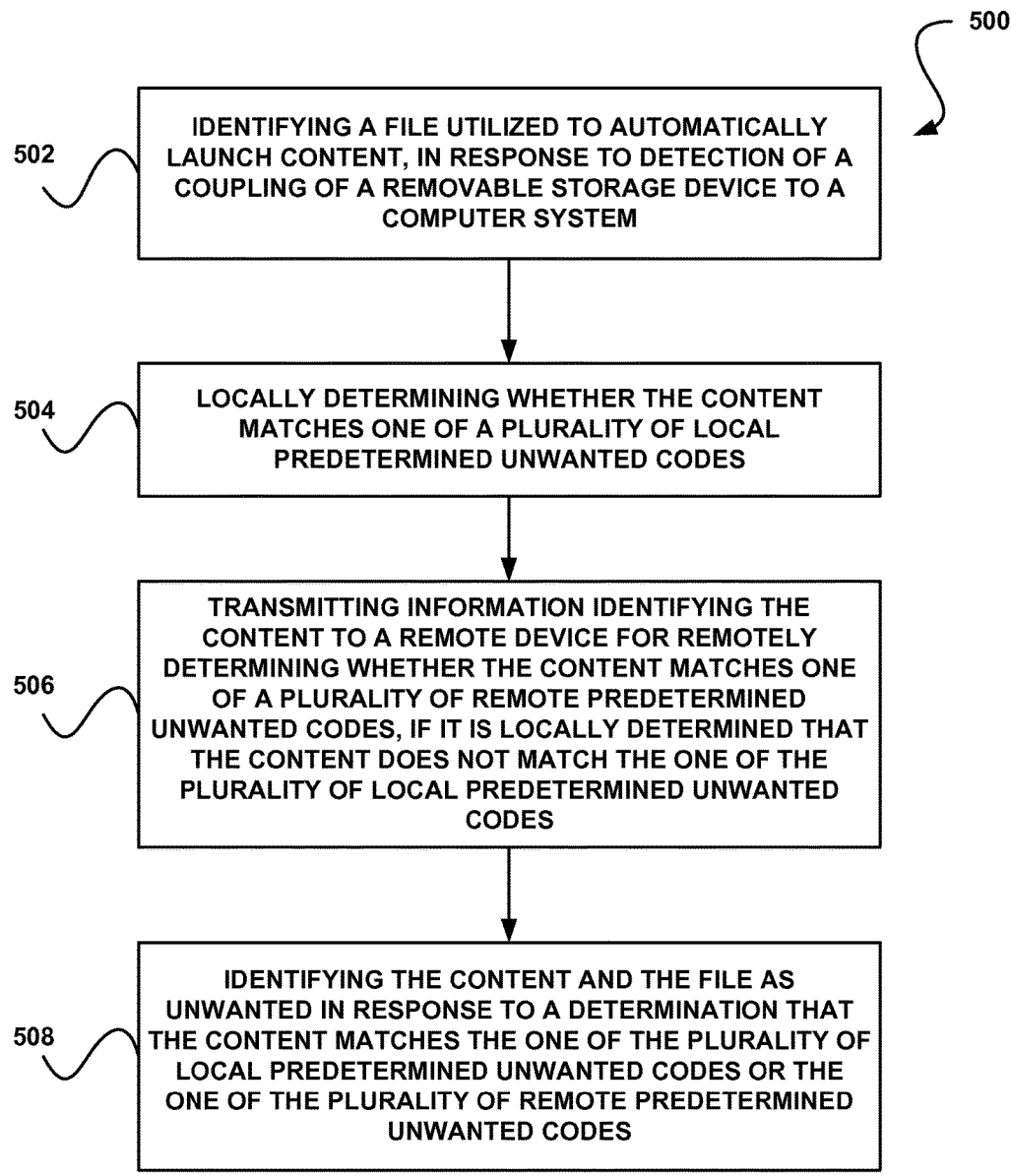
FIG. 5 shows a method for identifying a file utilized to automatically launch content as unwanted, in accordance with yet another embodiment.

FIG. 5 shows a method 500 for identifying a file utilized to automatically launch content as unwanted, in accordance with yet another embodiment. As an option, the method 500 may be carried out in the context of the architecture and environment of FIGS. 1-4. For example, the method 500 may be carried out if it is determined in operation 402 of FIG. 4 that unwanted code was not detected. Of course, however, the method 500 may be carried out in any desired environment. Again, it should be noted that the aforementioned definitions may apply during the present description.

As shown in operation 502, in response to detection of a coupling of a removable storage device to a computer system, a file utilized to automatically launch content is identified. The removable storage device may include any memory or disks capable of being coupled with the computer system, such as a USB drive, a flash media card, etc. In addition, the computer system may include any of the devices described above with respect to FIGS. 1 and/or 2 that are capable of being coupled to a removable storage device. It should be noted that the removable storage device may be coupled to the computer system via a USB port, a parallel port, etc.

In one embodiment, the computer system may detect the coupling of the removable storage device thereto. Just by way of example, the computer system may detect use of a port by the removable storage device. Of course, however, the coupling of the removable storage device and the computer system may be made in any desired manner.

Additionally, the file utilized to automatically launch content may also be identified in any desired manner. In one embodiment, the file may be identified by searching the removable storage device for a file capable of being utilized to launch content. For example, the file may be identified by scanning the removable storage device for the file.

In addition, in operation 504, it is locally determined whether the content matches one of a plurality of local predetermined unwanted codes. The local predetermined unwanted codes may include code predetermined to include malware, spyware, etc. which is locally stored (e.g. on the computer system, etc.). To this end, the determination may be made locally, for example, by way of the computing system (e.g. a security system installed on the computing system) performing the determination.

Furthermore, in operation 506, if it is locally determined that the content does not match the one of the plurality of local predetermined unwanted codes, information identifying the content is transmitted to a remote device for remotely determining whether the content matches one of a plurality of remote predetermined unwanted codes. Thus, if the local system (e.g. the computer system) is unable to determine whether the content is unwanted (by virtue of the content not matching any of the local predetermined unwanted codes), the information identifying the content is transmitted to a remote device (e.g. a device in communication with the computer system via a network, etc.) for remotely determining whether the content matches one of a plurality of remote predetermined unwanted codes.

In various embodiments, the information identifying the content may include the content itself, a fingerprint of the content, etc. Additionally, the remote predetermined unwanted codes may include code predetermined to include malware, spyware, etc. which is remotely stored (e.g. on the remote device, etc.). To this end, the determination may be made remotely, for example, by way of the remote device (e.g. a security system installed on the remote device) performing the determination.

Still yet, in operation 508, the content and the file is identified as unwanted in response to a determination that the content matches one of the local predetermined unwanted codes or one of the remote predetermined unwanted codes. Thus, if the content is determined to match one of the local predetermined unwanted codes, the content and the file may be automatically identified as unwanted and the information identifying the content may be prevented from being transmitted to the remote device. The remote device, which may be more up-to-date, thorough, robust, etc. with respect to a security system used for determining whether the content matches one of the remote predetermined unwanted codes, may thus optionally only receive the information identifying the content if the computer system is incapable of determining that the content matches one of the local predetermined unwanted codes.

It should be noted that the file may be identified as unwanted in response to a determination that the content matches one of the local predetermined unwanted codes since the file was previously identified (in operation 502) for use in automatically launching the content (e.g. and thus includes a reference to the content). Thus, the content and the associated file used for automatically launching such content may be identified as unwanted simultaneously. Moreover, in response to an identification of the content and the file as unwanted, such content and file may be deleted, quarantined, and/or any other desired action may be performed.

Figure 6:
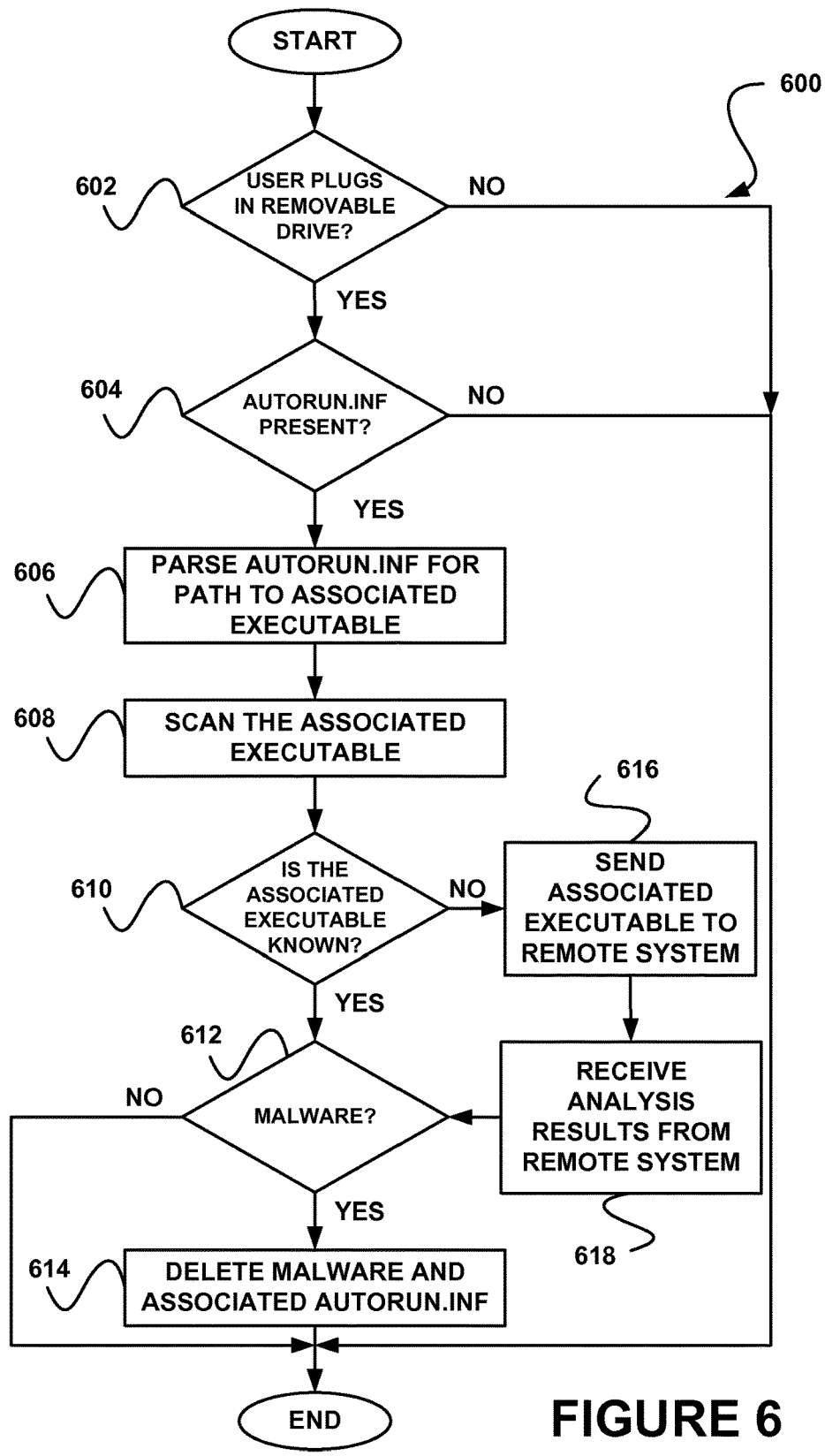
FIG. 6 shows a method for deleting unwanted content and a file utilized to automatically launch the unwanted content, in accordance with still yet another embodiment.

FIG. 6 shows a method 600 for deleting unwanted content and a file utilized to automatically launch the unwanted content, in accordance with still yet another embodiment. As an option, the method 600 may be carried out in the context of the architecture and environment of FIGS. 1-5. For example, the method 500 may be carried out if it is determined in operation 402 of FIG. 4 that unwanted code was not detected. Of course, however, the method 600 may be carried out in any desired environment. Yet again, it should be noted that the aforementioned definitions may apply during the present description.

As shown in decision 602, it is determined whether a user plugs in a removable drive. With respect to the present embodiment, plugging in the removable drive may include coupling the removable drive to a computer device. The drive may include a hard drive. Of course, it should be noted that in other embodiments it may be determined whether a user plugs in any desired type of storage device.

If it is determined that a user does not plug in a removable drive, the method 600 continues to wait for a user to plug in a removable drive. If, however, it is determined that that a user does plug in a removable drive, it is determined whether an autorun.inf file is present. Note decision 604. With respect to the present embodiment, the determination of whether an autorun.inf file is present may include determining whether an autorun.inf file is present on the removable drive.

If it is determined that an autorun.inf file is not present, the method 600 terminates. In response to a determination that an autorun.inf file is present, the autorun.inf file is parsed for a path to an associated executable, as shown in operation 606. For example, the autorun.inf file may only store a path to a single executable (e.g. executable code). Thus, the autorun.inf file may be parsed to remove headers, etc. associated therewith, such that content of the autorun.inf file including the path to the executable may be identified.

Furthermore, as shown in operation 608, the executable is scanned. In one embodiment, the executable may be identified (for scanning thereof) using the path. Thus, code located via the path may be scanned. With respect to the present embodiment, the executable may be scanned for malware. For example, the executable may be scanned by comparing the executable (or optionally a fingerprint of the executable, etc.) to known malware.

Based on the scanning, it is determined whether the executable is known. Note decision 610. With respect to the present embodiment, the determination may include determining whether the executable includes known malware (or optionally known wanted) code. For example, if, based on the scanning, it is inconclusive that whether the executable is known, it may be determined that the executable is not known.

If it is determined that the executable is known, it is determined whether the executable is malware (decision 612). For example, it may be determined whether the executable is known malware. The executable may be determined to be known malware if the executable matches known malware. In response to a determination that the executable is known (decision 610), but that that executable is not known malware (decision 612), the method 600 terminates. For example, it may be determined that the executable is known (decision 610), but that that executable is not known malware (decision 612) if the executable matches known wanted code.

In response to a determination that the executable is known malware (decision 612), the malware and the autorun.inf file are deleted, as shown in operation 614. In this way, the executable which is determined to include malware and the autorun.inf file which is used to launch such executable may be deleted. For example, the executable and the autorun.inf file may be deleted from the removable drive.

However, if it is determined in decision 610 that the executable is not known, the executable (or a fingerprint thereof) is sent to a remote system. Note operation 616. The remote system may include a backend server (e.g. of an anti-malware vendor, etc.) that is in communication with the computer system in which the removable drive is plugged (e.g. via a network, etc.).

The backend server may optionally receive updated signature files and threat information on an hourly or daily basis from a plurality of computer systems (e.g. end user computer system, etc.). The backend server may further, in real time, collectively capture and correlate fingerprints of new and potentially malicious code across the computer systems, by virtue of each computer system transmitting compact fingerprints about a suspicious file to an automated evaluation system of the backend server for immediate assessment. Immediately, the backend server may cross-check the characteristics of the file to determine its threat level and may notify the computer system to take appropriate action.

To this end, the backend server may analyze the executable for determining whether the executable includes malware. Further, analysis results are received from the remote system, as shown in operation 618. The analysis results may indicate whether the executable is malware. To this send, it is determined, based on the analysis results, whether the executable is malware (decision 612).

In response to a determination that the executable is not malware (decision 612), the method 600 terminates. However, in response to a determination that the executable includes malware (decision 612), the malware and the autorun.inf file are deleted, as described above with respect to operation 614.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

The invention claimed is:

1. One or more storage devices comprising instructions that when executed cause one or more processors to at least:
   perform a first scan of a computer system;
   detect, during the first scan, a first file on the computer system, the first file known to be a malicious file;
   delete or quarantine the first file;
   determine whether the first file is of a type to be automatically launched via a second file different than the first file, the second file to automatically launch the first file by initiating execution of the first file;
   in response to the determination that the first file is of the type to be automatically launched via the second file, perform a second scan of the computer system to locate the second file; and
   delete the second file.

2. The one or more storage devices of claim 1, wherein the second file is stored on a removable storage device.

3. The one or more storage devices of claim 2, wherein the first file is stored on the removable storage device.

4. The one or more storage devices of claim 1, wherein the first file includes obfuscated code.

5. The one or more storage devices of claim 1, wherein the second file includes a pointer to the first file.

6. The one or more storage devices of claim 1, wherein the instructions, when executed, cause the one or more processors to locate the second file by scanning the second file for an identifier associated with the first file.

7. The one or more storage devices of claim 6, wherein the identifier associated with the first file includes a file name of the first file.

8. The one or more storage devices of claim 6, wherein the identifier associated with the first file includes a path name to the first file.

9. The one or more storage devices of claim 1, wherein the second file is an autorun.inf file.

10. The one or more storage devices of claim 1, wherein the processor is to determine whether the first file is of the type to be automatically launched via the second file by querying a database of known malware.

11. A method, comprising:
performing a first scan of a computer system;
detecting, during the first scan, a first file on the computer system, the first file known to be a malicious file;
deleting or quarantining the first file;
determining whether the first file is of a type to be automatically launched via a second file, the second file different than the first file, the second file to automatically launch the first file by initiating execution of the first file;
in response to the determination that the first file is of the type to be automatically launched via the second file, performing a second scan of the computer system to locate the second file; and
deleting the second file.

12. The method of claim 11, wherein the second file is stored on a removable storage device and the second scan is performed on the removable storage device.

13. The method of claim 12, wherein the first file is stored on the removable storage device.

14. The method of claim 11, wherein the first file includes obfuscated code.

15. The method of claim 11, wherein the second file includes a pointer to the first file.

16. The method of claim 11, wherein the performing of the second scan includes scanning the second file for an identifier associated with the first file.

17. The method of claim 16, wherein the identifier associated with the first file includes a file name of the first file.

18. The method of claim 11, wherein the performing of the second scan includes determining that an identifier associated with the first file is included in the second file.

19. The method of claim 11, wherein the second file is an autorun.inf file.

20. The method of claim 11, wherein the determining whether the first file is of the type to be automatically launched via the second file includes querying a database of known malware.

21. A computer system, comprising:
a processor; and
a memory including instructions, that, when executed, cause the processor to:
perform a first scan of the computer system;
detect, during the first scan, a first file on the computer system, the first file known to be a malicious file;
delete or quarantine the first file;
determine whether the first file is of a type to be automatically launched via a second file different than the first file, the second file to automatically launch the first file by initiating execution of the first file;
in response to the determination that the first file is of the type to be automatically launched via the second file, perform a second scan of the computer system to locate the second file; and
delete the second file.

22. The computer system of claim 21, wherein the second file is stored on a removable storage device and the second scan is performed on the removable storage device.

23. The computer system of claim 22, wherein the first file is stored on the removable storage device.

24. The computer system of claim 21, wherein the first file includes obfuscated code.

25. The computer system of claim 21, wherein the second file includes a pointer to the first file.

26. The computer system of claim 21, wherein the instructions when executed cause the processor to scan the second file for an identifier associated with the first file.

27. The computer system of claim 21, wherein the instructions cause the processor to locate the second file by scanning the second file for an identifier associated with the first file.

28. The computer system of claim 27, wherein the identifier associated with the first file includes a file name of the first file.

29. The computer system of claim 21, wherein the instructions cause the processor to locate the second file by determining that an identifier associated with the first file is included in the second file.

30. The computer system of claim 21, wherein the second file is an autorun.inf file.

31. The computer system of claim 21, wherein the processor is to determine whether the first file is of the type to be automatically launched via the second file by querying a database of known malware.

* * * * *